(12) United States Patent
Liang et al.

(10) Patent No.: US 12,141,060 B1
(45) Date of Patent: Nov. 12, 2024

(54) METHOD OF MANAGING GARBAGE COLLECTION OPERATION IN FLASH MEMORY BASED ON TYPES OF SOURCE BLOCKS AND RELATED MEMORY CONTROLLER AND STORAGE SYSTEM

(71) Applicant: Silicon Motion, Inc., Hsinchu County (TW)

(72) Inventors: Chia-Chi Liang, Hsinchu (TW); Cheng-Yu Tsai, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/144,864

(22) Filed: May 9, 2023

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ......... G06F 12/0253; G06F 2212/7205; G06F 3/0652
See application file for complete search history.

(56) References Cited

U.S. PATENT DOCUMENTS

| 10,754,769 B2 | 8/2020 | Bennett |
| 2015/0169442 A1* | 6/2015 | Fisher ................. G06F 12/0253 711/103 |
| 2020/0097403 A1 | 3/2020 | Saxena |
| 2023/0010632 A1* | 1/2023 | Pletka .................. G06F 3/0688 |
| 2023/0017946 A1* | 1/2023 | Wei ..................... G06F 12/0246 |

FOREIGN PATENT DOCUMENTS

CN 103336744 A 10/2013

* cited by examiner

Primary Examiner — Khoa D Doan
Assistant Examiner — Tong B. Vo
(74) Attorney, Agent, or Firm — Winston Hsu

(57) ABSTRACT

A method of managing a garbage collection (GC) operation on a flash memory includes: dividing a GC operation into a plurality of partial GC operations; determining a default partial GC operation time period for each partial GC operation; determining a partial GC intensity according to at least a basic adjustment factor and an amplification factor; determining the basic adjustment factor according to a type of one or more source blocks corresponding to the GC operation; determining the amplification factor according to a percentage of invalid pages in the one or more source blocks corresponding to the GC operation; and performing the plurality of partial GC operations according to the partial GC intensity and the default partial GC operation time period.

19 Claims, 7 Drawing Sheets

| GC type | Normal Case | | WL or RD | |
|---|---|---|---|---|
| | Amp range | ptGcT' | Amp range | ptGcT' |
| S2T | Amp=1 | ptGcT*(Amp/2)*(1+(LOS/2)) | Amp=4 | ptGcT*(Amp/2)*(1+(LOS/2)) |
| T2T | 1≤Amp≤32 | ptGcT*(Amp)*(1+(LOS/2)) | 4≤Amp≤32 | ptGcT*(Amp)*(1+(LOS/2)) |
| S2T in mixed-mode | 2≤Amp≤32 | ptGcT*((Amp+1)/3)*(1+(LOS/2)) | 11≤Amp≤32 | ptGcT*((Amp+1)/3)*(1+(LOS/2)) |
| T2T in mixed-mode | 2≤Amp≤32 | ptGcT*((Amp+1)/3)*(1+(LOS/2)) | 11≤Amp≤32 | ptGcT*((Amp+1)/3)*(1+(LOS/2)) |

FIG. 5

| GC type | Amp range | | ptGcT' |
|---|---|---|---|
| | Normal Case | WL or RD | |
| S2X | Amp=1 | Amp=$A_{high}$ | ptGcT*(Amp/$EGBC_{S2X}$)*(1+k*LOS) |
| X2X | 1≤Amp≤$A_{MAX}$ | $A_{high}$≤Amp≤$A_{MAX}$ | ptGcT*(Amp/$EGBC_{X2X}$)*(1+k*LOS) |
| X2X and S2X in mixed-mode | ($EGBC_{mix}$−1) ≤Amp≤$A_{MAX}$ | ($EGBC_{mix}$*$A_{high}$−1) ≤Amp≤$A_{MAX}$ | ptGcT*(Amp+1)/($EGBC_{mix}$)*(1+k*LOS) |

FIG. 6

METHOD OF MANAGING GARBAGE COLLECTION OPERATION IN FLASH MEMORY BASED ON TYPES OF SOURCE BLOCKS AND RELATED MEMORY CONTROLLER AND STORAGE SYSTEM

BACKGROUND OF THE INVENTION

1. Field of the Invention

The present invention relates to flash memory, and more particularly, to a method of managing garbage collection operations in flash memory based on types of source blocks and related memory controller and storage system.

2. Description of the Prior Art

Due to the nature of flash memory, flash memory devices do not support overwrite operations. When new data needs to replace older data already stored in the flash memory, the new data will be written to a new location, and the data in the old location becomes invalid. Thus, the amount of invalid data will increase as overwriting of older data is repeated. To ensure an adequate amount of storage space for new data, flash memory devices rely on garbage collection (GC) operations to free up space occupied by the invalid data.

The GC operation selects one or more source blocks from the flash memory and copies only valid pages (i.e., pages with valid data) from the source block to a destination block. After all valid pages have been copied to the destination block, the selected one or more source blocks can be erased and thus turned into a spare block to which data can be written. As the GC operation is an internal behavior of the flash memory device, a flash memory controller needs to concurrently handle the GC operation as well as host commands. This means that once the GC operation starts, writing/reading based on the host commands will be restricted, leading to unstable response times for the host commands and even deterioration in the write/read performance of the flash memory device. In view of the above, there is a need to provide mechanisms for managing GC operations in flash memory devices.

SUMMARY OF THE INVENTION

With this in mind, it is one object of the present invention to manage garbage collection (GC) operations. Embodiments of the invention alternate between performing partial GC operations (which are divided by a full GC operation) and handling host write commands, while properly adjusting the intensity of the GC operation to prevent host write command timeouts. In other words, the invention aims to balance GC tasks and host command tasks more effectively, managing GC operations to avoid command timeouts. Specifically, the invention determines the intensity of GC operations by calculating multiple factors based on GC type (e.g., S2S, S2T, T2T, wear-leveling), write type (writing data to SLC or TLC blocks), data entropy, remaining capacity, and the number of spare blocks of the flash memory. This helps stabilize the performance of the flash memory from completely empty to fully filled. Even in cases of sudden power-off events, the present invention still maintains a relatively constant number of spare blocks. Moreover, the present invention can prevent host write command timeouts caused by excessive GC intensity and avoid the inability to free up blocks due to insufficient GC intensity.

According to one embodiment, a method of managing a garbage collection (GC) operation on a flash memory is provided. The method comprises: dividing a GC operation into a plurality of partial GC operations; determining a default partial GC operation time period for each partial GC operation; determining a partial GC intensity according to at least a basic adjustment factor and an amplification factor; determining the basic adjustment factor according to a type of one or more source blocks corresponding to the GC operation; determining the amplification factor according to a percentage of invalid pages in the one or more source blocks corresponding to the GC operation; and performing the plurality of partial GC operations according to the partial GC intensity and the default partial GC operation time period.

According to one embodiment, a memory controller for use in a flash memory to control the flash memory and manage a garbage collection (GC) operation on the flash memory is provided. The memory controller comprises: a storage unit and a processing unit. The storage unit is configured to store information and program codes. The processing unit is operable to execute the program codes to be configured to: divide a GC operation into a plurality of partial GC operations; determine a default partial GC operation time period for each partial GC operation; determine a partial GC intensity according to at least a basic adjustment factor and an amplification factor; determine the basic adjustment factor according to a type of one or more source blocks corresponding to the GC operation; determine the amplification factor according to a percentage of invalid pages in the one or more source blocks corresponding to the GC operation; and perform the plurality of partial GC operations according to the partial GC intensity and the default partial GC operation time period.

According to one embodiment, a storage system is provided. The storage system comprises a flash memory and a memory controller. The memory controller is configured to control the flash memory and manage a garbage collection (GC) operation on the flash memory is provided. The memory controller is configured to: divide a GC operation into a plurality of partial GC operations; determine a default partial GC operation time period for each partial GC operation; determine a partial GC intensity according to at least a basic adjustment factor and an amplification factor; determine the basic adjustment factor according to a type of one or more source blocks corresponding to the GC operation; determine the amplification factor according to a percentage of invalid pages in the one or more source blocks corresponding to the GC operation; and perform the plurality of partial GC operations according to the partial GC intensity and the default partial GC operation time period.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates a table regarding a range of amplification factors and how to determine a partial GC operation time period for GC operations of different types according to one embodiment of the present invention.

FIG. 6 illustrates a table regarding a range of amplification factors and how to determine a partial GC operation time period for GC operations of different types according to another embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
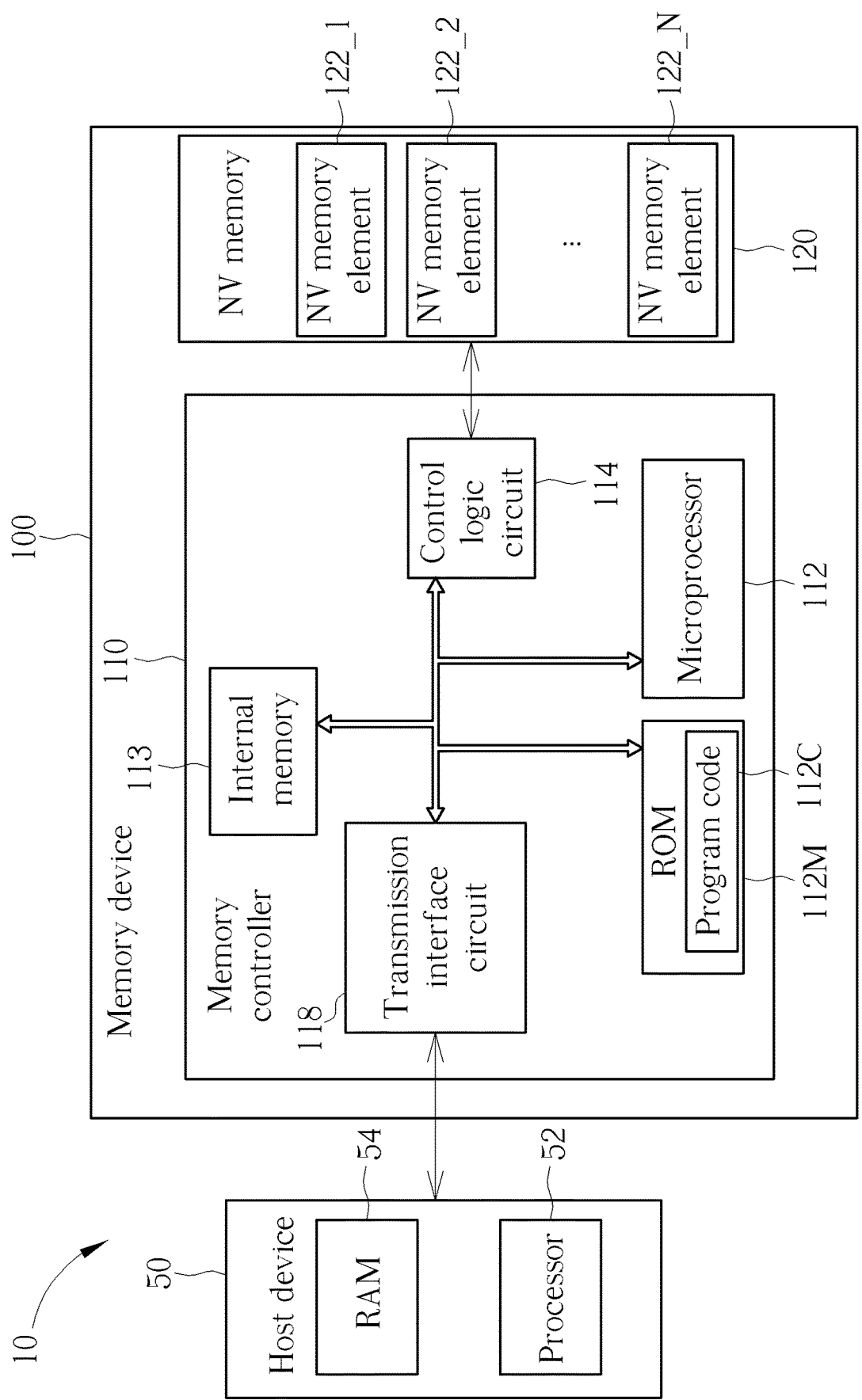
FIG. 1 is a diagram illustrating an electronic device and a storage system according to an embodiment of the present invention.

FIG. 1 is a diagram illustrating an electronic device 10 according to an embodiment of the present invention, where the electronic device 10 comprises a host device 50 and a memory device 100. The host device 50 may comprise: at least one processor 52 configured to control operations of the host device 50, and a random access memory 54 configured to store data and information required by the processor 52. Examples of the host device 50 may include, but are not limited to: a smartphone, a tablet computer, a wearable device, a personal computer such as a desktop computer or a laptop computer, an imaging device such as a digital still camera or a video camera, a game console, a car navigation system, a printer, a scanner, or a server system. Examples of the memory device 100 may include, but are not limited to: a portable memory device (such as a memory card conforming to SD/MMC, CF, MS, XD, or UFS specifications), a solid-state drive (SSD), and various embedded storage devices (such as an embedded storage device conforming to UFS or EMMC specifications).

According to various embodiments, the memory device 100 may comprise a controller such as a memory controller 110 and may further comprise a non-volatile (NV) memory 120. The NV memory 120 is configured to store data. The NV memory 120 may comprise one or more NV memory elements, such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or memory cells having a three-dimensional structure.

As shown in FIG. 1, the memory controller 110 may comprise a processing unit 112, a read-only memory (ROM) 112M, an internal memory 113, a control logic circuit 114, and a transmission interface circuit 118, where at least one portion (e.g. a portion or all) of these components may be coupled to one another through a bus. The internal memory 113 can be implemented by one or more RAM devices. For example, the internal memory 113 may be a static RAM (SRAM) and/or a dynamic RAM (DRAM). The internal memory 113 may be configured to provide internal storage space to the memory controller 110, for example, temporarily storing information, such as mapping information, variable/parameters and/or data. In some embodiments, the memory controller 110 may not include the internal memory 113. Instead, the memory controller 110 may rely on host memory buffer (HMB) technology. With the HMB technology, the memory controller 110 could utilize the RAM 54 of the host device 50 to compensate for the lack of internal memory, thereby enhancing the read/write performance of the storage system 100. In addition, the ROM 112M of this embodiment is configured to store a program code 112C, and the processing unit 112 is configured to execute the program code 112C to control access of the NV memory 120. Alternatively, the program code 112C may be stored in the NV memory 120.

The memory controller 110 controls reading, writing, and erasing of the NV memory 120 through a control logic circuit 114. In addition, the memory controller 110 could perform writing of data based on host commands from the host device 50 and writing of valid data which is read from the NV memory 120 by the garbage collection and/or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multimedia Card (eMMC) specification, or Universal Flash Storage (UFS) specification) and may perform communications with the host 50 according to the specific communications specification.

Typically, the host device 50 may indirectly access the memory device 100, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses correspond to the logic addresses. When the memory controller 110 performs an erase operation on any NV memory element 122_k within the plurality of NV memory elements 122_1-122_N, at least one block of the NV memory element 122_k may be erased. In addition, each block of the NV memory element 122_k may comprise multiple pages, and an access operation (e.g., read or write) may be performed on one or more pages.

In one embodiment, each one of NV memory elements 122_1-122_N could be a NV memory die. There is control circuitry on each one of NV memory dies 122_1-122_N for executing memory operation commands issued by the memory controller 110. In addition, each of the NV memory dies 122_1-122_N could comprise a plurality of planes. Each plane may comprise a plurality of blocks of memory cells and associated row and column control circuitry. The memory cells in each plane may be arranged in a 2D or 3D memory structure. The memory controller 110 may rely on multi-plane commands to access the NV memory 120.

In the following, several types of GC operations will be mentioned. A "S2S" GC operation refers to moving data on valid pages of one or more single-level cell (SLC) blocks to blank pages of a block. A "S2M" GC operation refers to moving data on valid pages of one or more SLC blocks to blank pages of a multiple-level cell (MLC) block. A "S2T" GC operation refers to moving data on valid pages of one or more SLC blocks to blank pages of a triple-level cell (TLC) block. A "S2Q" GC operation refers to moving data on valid pages of one or more SLC blocks to blank pages of a quad-level cells (QLC) block. A "M2M" GC operation refers to moving data on valid pages of one or more multi-level cell MLC blocks to blank pages of a MLC block. A "T2T" GC operation refers to moving data on valid pages of TLC blocks to blank pages of a TLC block. A "Q2Q" GC operation refers to moving data on valid pages of QLC blocks to blank pages of a QLC block.

In one embodiment, the memory controller 110 would perform a plurality of partial GC operations individually with short time periods rather than a full GC operation with a long time period. That is, a GC operation will be divided into a plurality of partial GC operations. The plurality of partial GC operations and normal access operations based on host commands are alternately performed by the memory controller 110. Performing partial GC operations may reduce the time that the memory controller 110 takes to performs normal operations. On the other hand, GC operation is essentially to free up blocks occupied by invalid data. Therefore, the memory controller 110 would determine and adjust a partial GC intensity (also meaning the GC intensity), which indicates a ratio of an instant time period in which a partial GC operation needs to be performed, with respect to a default partial GC operation time period in which a partial GC operation is performed by default.

Specifically, the default partial GC operation time period ptGcT can further be determined by: ptGcT=(LastGcT)/(ptGcTimes). The value "LastGcT" refers to the time period required to complete the last full garbage collection operation. The value "ptGcTimes" refers to the number of partial GC operations the memory controller 110 needs to perform while filling an entire spare block according to host commands (or filling an entire destination block corresponding to the GC operation). Typically, if the memory controller 110 determines that the GC operation is necessary, the memory controller 110 will perform one partial GC operation upon completion of writing one chunk of data based on host commands. Thus, the value "ptGcTimes" can be obtained by: ptGcTimes=(Total number of pages in a spare block)/(Number of pages per chunk). In addition, the default partial GC period "ptGcT" refers to a potential time period required to complete a single partial GC operation. In some embodiments, the value "ptGcTimes" refers to the number of partial GC operations the memory controller 110 needs to perform to move valid pages from one or more source blocks to a destination block. Thus, the value "ptGcTimes" can be obtained by: ptGcTimes=(Total number of valid pages in source blocks)/(Number of pages per chunk).

According to various embodiments of the present invention, the memory controller 110 would determine the partial GC intensity differently with various factors. First, the memory controller 110 would determine the partial GC intensity according to a basic adjustment factor, which is related to a type of source blocks and a type of destination block (s). Specifically, the source blocks are those blocks that the partial GC operation moves valid data from (e.g., reading data on valid pages of the source block (s)), and the destination block (s) are those blocks that the partial GC operation moves valid data to (e.g., programming valid data to blank pages of the destination block (s)).

In one embodiment, the memory controller 110 would perform the GC operation (including several partial GC operations) to move valid data from SLC blocks to one TLC block (i.e., S2T GC operation). Typically, due to the density of memory cells, one S2T GC operation (including several S2T partial GC operations) would release three SLC blocks (which are source blocks of the S2T GC operation) and consume one spare TLC block (which is a destination block of the S2T GC operation). This means a number of total spare blocks in the NV memory 120 would increase by 2. In view of this, the partial GC intensity for the S2T GC operation must be set to ensure that one S2T GC operation is completed after every two spare blocks are entirely filled or closed, wherein a "closed" block means a block is no longer available for storing additional data. In view of this, the basic adjustment factor for the S2T GC operation would be set as 2, which leads to the partial GC intensity of ½ (i.e., a reciprocal of the basic adjustment factor). This means the partial GC operation time period for S2T GC operation ptGcT$_{S2T}$ could be ½ times that of a default partial GC period ptGcT, i.e., ptGcP$_{S2T}$=(½)*ptGcT. In a preferred embodiment, an amplification factor "Amp" (which will be explained later) can be taken into consideration in calculating the partial GC operation period for S2T GC operation ptGcP$_{S2T}$. In view of this, the partial GC operation time period could be determined by: ptGcP$_{S2T}$=(½)*(Amp)*ptGcT.

Figure 2:
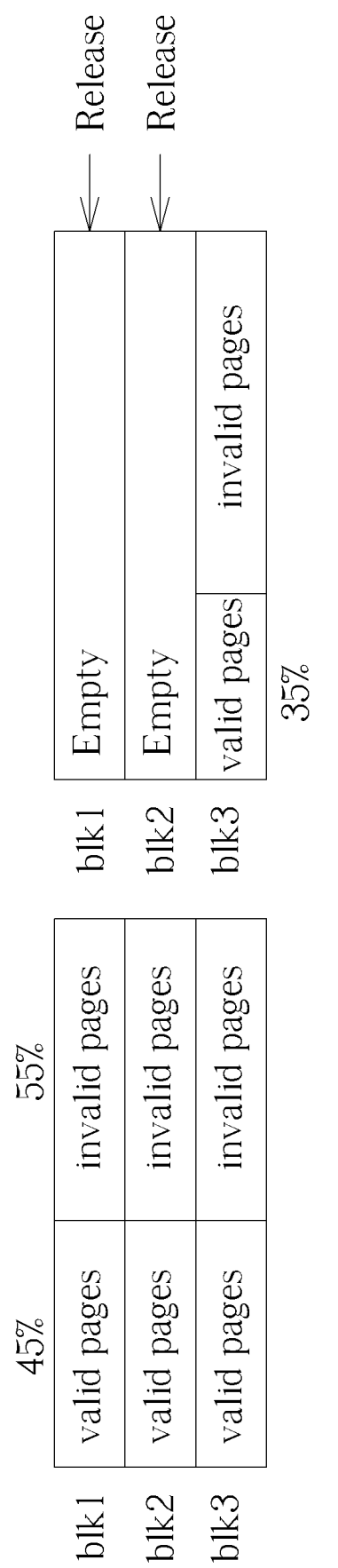
FIG. 2 is a diagram illustrating a T2T GC operation in a case where the percentages of valid pages in T2T source blocks are low.

In one embodiment, the memory controller 110 would perform the GC operation (including several partial GC operations) to move valid data from one or more TLC blocks to one TLC block (i.e., T2T GC operation). Please refer to FIG. 2, assuming valid page percentages of TLC source blocks blk1, blk2 and blk3 are low (below 50%), a T2T GC operation (including multiple T2T partial GC operations) would release two TLC blocks blk1 and blk2, and consume one spare TLC block (i.e., which is a destination block of the T2T GC operation). This means the number of total spare blocks in the NV memory 120 would increase by 1. In view of this, the partial GC intensity for the T2T GC operation must be set to ensure that one T2T GC operation is completed after every one spare block is entirely filled or closed. In view of this, the basic adjustment factor for the S2T GC operation would be set as 1, which leads to the partial GC intensity of 1 (i.e., a reciprocal of the basic adjustment factor). This means the partial GC operation time period for T2T GC operation ptGcT$_{T2T}$ would be identical to the default partial GC operation time period ptGcT, i.e., ptGcT$_{T2T}$=ptGcT.

Figure 3:
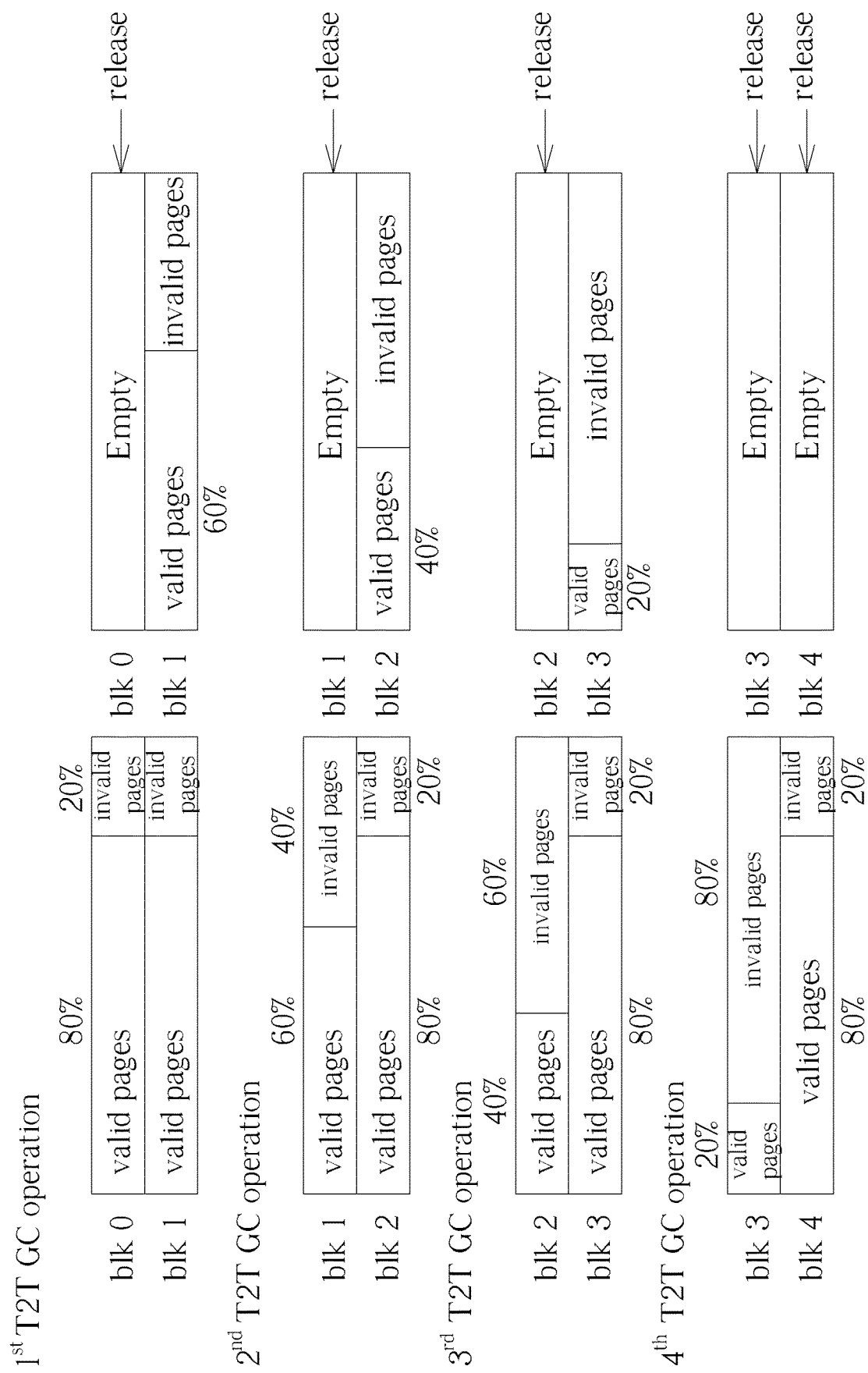
FIG. 3 is a diagram illustrating T2T GC operations in a case where the percentages of valid pages in T2T source blocks are high.

On the other hand, if valid page percentages of TLC source blocks are high (e.g. above 50%), multiple T2T GC operations need to be performed to release TLC blocks. Please refer to FIG. 3, which illustrates how multiple T2T GC operations are performed to release two TLC source blocks. In a first T2T GC operation, source blocks are blk0 and blk1 whose valid page percentages are 80%. After the first T2T GC operation, one spare TLC block is consumed for storing valid pages of the source blocks blk0 and blk1, the source block blk0 is released and valid page percentage of the source block blk1 is reduced to 60%. Thus, the total number of spare blocks in the NV memory 120 remains unchanged. In a second T2T GC operation, the valid page percentage of the source block blk1 is 60% and the valid page percentage of the source block blk2 is 80%. After the second T2T GC operation, one spare TLC block is consumed for storing valid pages of the source blocks blk1 and blk2, the source block blk1 is released and valid page percentage of the source block blk2 is reduced to 40%. Thus, the total number of spare blocks in the NV memory 120 remains unchanged. In a third T2T GC operation, the valid page percentage of the source block blk2 is 40% and the valid page percentage of the source block blk3 is 80%. After the third T2T GC operation, one spare TLC block is consumed for storing valid pages of the source blocks blk2 and blk3, the source block blk2 is released and valid page percentage of the source block Blk3 is reduced to 20%. Thus, the total number of spare blocks in the NV memory 120 remains unchanged. In a fourth T2T GC operation, the valid page percentage of the source block blk3 is 20% and the valid page percentage of the source block blk4 is 80%. After the fourth T2T GC operation, one spare TLC block is consumed for storing valid pages of the source blocks blk3 and blk4, both the source blocks blk3 and blk4 are released. Thus, the total number of spare blocks in the NV memory 120 is increased by 1.

In view of above, it can be understood that 4 or 5 T2T GC operations are necessary to gain one new spare TLC block (if the valid page percentages of source blocks are higher than 80%). Thus, the partial GC intensity for the T2T GC operation must be set to ensure that 4 or 5 T2T GC operations are completed after every one spare block is entirely filled or closed. In view of this, the partial GC intensity for the T2T GC operation would be 5 under high valid page percentage condition, which means the partial GC operation period for T2T GC operation $ptGcT_{T2T}$ would be 5 times that of the default partial GC period ptGcT, i.e., $ptGcP_{T2T}=5*ptGcT$. Thus, the partial GC operation time period for T2T GC operation $ptGcT_{T2T}$ in both high and low valid page percentage conditions can be represented as: $ptGcT_{T2T}=(Amp)*(ptGcT)$, wherein "Amp" is the above-mentioned amplification factor.

In one embodiment, the amplification factor Amp would be determined as a rounding of (TlcVpc/rlsVpc), where the value "TlcVpc" is a total number of all (or valid) pages included in one source (TLC or other types) block. The value "rlsVpc" is a total number of valid pages that can be released by an instant GC operation, excluding a total number of valid pages in remaining (unfinished) source block (s) from a previous GC operation, which could be obtained by:

rlsVpc=(TlcVpc*rlsBlkCnt−trueSrcVpc)/rlsBlkCnt.

Please note that, the remaining (unfinished) source block (s) from the previous GC operation means the source block (s) whose partial valid data has been moved to the destination block. For example, in the second T2T GC operation mentioned in FIG. 3, the source block blk1 is the remaining (unfinished) source block (s) from the previous GC operation (the first T2T GC operation). Moreover, the value "rlsBlkCnt" represents a total number of source blocks in the instant GC operation, excluding the remaining (unfinished) source block (s) from the previous GC operation. That is, the value "rlsBlkCnt" is a result of subtracting a total number "srcBlkCnt" of source blocks in the instant GC operation by a total number "residueBlkCnt" of source block (s) that remains from the previous GC operation, i.e., rlsBlkCnt=srcBlkCnt-residueBlkCnt. Taking the case of FIG. 3 as example, in the second T2T GC operation, srcBlkCnt is 2 (i.e., blk1 and blk2), residueBlkCnt is 1 (i.e., blk1 is remaining from the first T2T operation) and rlsBlkCnt is 1 (i.e., blk2).

In addition, the value "trueSrcVpc" represents a total number of valid pages in the source blocks in the instant GC operation, excluding valid pages of the remaining (unfinished) source block (s) from the previous GC operation. That is, the value "trueSrcVpc" is a result of subtracting a total number "srcVpc" of valid pages of the source blocks in the instant GC operation by a total number "residueVpc" of valid pages of the source block (s) that remains from the previous GC operation, i.e., trueSrcVpc=srcVpc−residueVpc. Taking the case of FIG. 3 as example, in the second T2T GC operation, "residueVpc" corresponds to the number of valid pages in the blk1 (which is remaining from the first T2T GC operation) and "trueSrcVpc" corresponds to the number of valid pages in the blk2.

In addition, the amplification factor Amp could also be determined according to a percentage of invalid pages in each source block in the instant GC operation, excluding a percentage of invalid pages of the remaining (unfinished) source block (s) from the previous GC operation. For example, in one GC operation, source blocks are blk0, blk1 and blk2. The percentage of invalid pages in source block blk0 is IA, in source block blk1 is IB, and in source block blk2 is IC and the source block blk0 remains from a previous GC operation. Thus, the amplification factor Amp could be determined according to a reciprocal of an average of the percentages of invalid pages in source blocks blk1 and blk2, i.e., Amp=1/((IB+IC)/2).

In one embodiment, the GC operation may be associated with more than one types of data moving, i.e., a mixed-mode GC operation. The mixed-mode GC operation may involve both S2T GC operation and T2T GC operation. The mixed-mode GC operation could occur when host data is only writing to the SLC blocks (as cache blocks) and remaining capacity of the NV memory 120 is relatively low. Under such condition, the data in the NV memory 120 will be distributed across both TLC blocks (which are written through GC operations) and SLC blocks (which host data is written to). Considering this, when the number of closed SLC blocks reaches a predetermined threshold that necessitates the GC operation, the S2T GC operation will be performed; when the number of closed TLC blocks reaches a predetermined threshold that necessitates the GC operation, T2T GC operation will be performed, leading to the mixed-mode GC operation. Under the mixed-mode operation, in order to maintain the quantity of the number of spare blocks in the NV memory 120, the arrangement of GC operations of multiple types shown by FIG. 4 may be applied.

Figure 4:
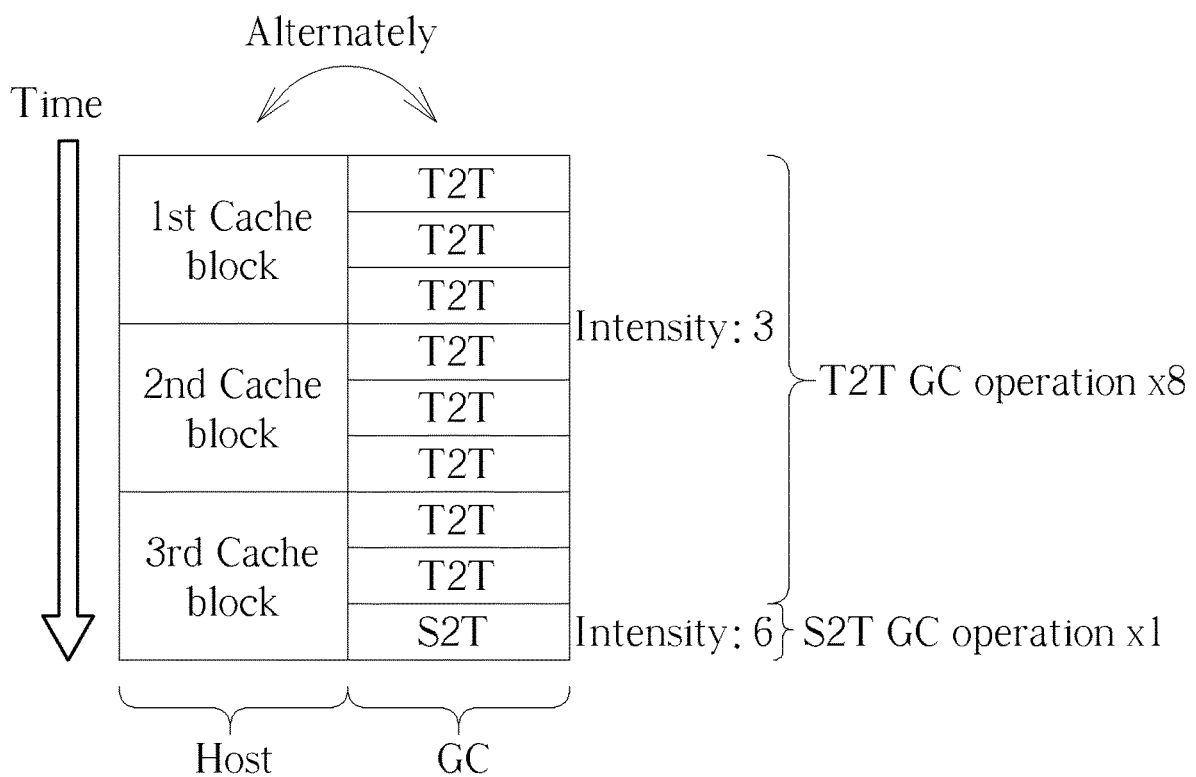
FIG. 4 is a diagram illustrating the arrangement of GC operations of different types in a mixed-mode.

Please refer to FIG. 4. Assuming the data entropy (which is substantially identical to the amplification factor) corresponds to the TLC (source) blocks is 8, the memory controller 110 will, after filling three cache blocks based on host commands, complete T2T GC operation 8 times and S2T GC operation once, thereby releasing three blocks (i.e., one TLC block and two SLC blocks). In this way, the NV memory 120 will gain an increase of three spare blocks, which can balance the consumption of the above-mentioned three cache blocks. In order to maintain the quantity of the number of spare blocks in the NV memory 120, releasing of three blocks needs to be completed within the time the memory controller 110 takes to fill three cache blocks. Therefore, the partial GC intensity for the T2T GC operation only needs to be increased by 3 times, i.e., (8+1)/3=3. In this case, 8 T2T GC operations are distributed across the time the memory controller 110 takes to fill the first two cache blocks and the first ⅔ of the time the memory controller 110 takes to fill the third cache block. In addition, the final ⅓ of the time the memory controller 110 takes to fill the third cache block is reserved for the S2T operation. As the partial GC intensity for the S2T GC operation is designed to complete once every two blocks are filled (based on host commands), the partial GC intensity for the S2T GC operation in the mixed-mode must be increased to six times its original value. That is, the partial GC operation time period $ptGCT_{MIX\_T2T}$ for the S2T GC operation in the mixed-mode will be determined by: $ptGcTMIX_{S2T}=ptGcT*((Amp+1)*(½)*(⅓)*2)$ and the partial GC operation time period $ptGCT_{MIX\_T2T}$ for the T2T GC operation in the mixed-mode will be determined by: $ptGcT_{MIX\_T2T}=ptGcT*((Amp+1)*⅓)$.

In one embodiment, sine wear-leveling and read-disturbance situations rely on GC operations to move data between blocks of the NV memory 120, when the memory controller 110 determines to perform the wear-leveling operation or handle the read-disturbance situation, it would adjust the minimum value of the amplification factor Amp to 4. This adjustment enlarges the partial GC intensity to perform extra GC operations in response to wear-leveling and read-disturbance situations. In view of this, the partial GC intensity would be increased by at least four times. That is, for the S2T GC operation, the amplification factor would be 4; for the T2T GC operation, the amplification factor would be greater than or equal to 4 and less than or equal to 32 (i.e., 4≤Amp≤32).

In one embodiment, assuming that the number of spare blocks of the NV memory 12 is pretty low (i.e., lower than a predetermined level), the memory controller 110 would enlarge the default partial GC operation time period ptGcT by a low spare block condition adjustment factor, which will preferably be: (1+(LOS/2)). That is, the partial GC operation time period for low spare block count condition will be: (1+(LOS/2))*(ptGcT). The value "LOS" could be determined according to a predetermined spare block count threshold SPRTHD and the number of spare blocks SPRN in the NV memory 120 (i.e., the spare block count of the NV memory 120). That is, the value "LOS" could be determined by: LOS=SPRTHD-SPRN. The low spare block condition adjustment factor will be useful in situations where concessive sudden power off recovery (SPOR) tests are repeated when the number of spare blocks in the NV memory 120 is low. Since the re-build process following an SPOR significantly consumes spare blocks in the NV memory 120, it is necessary to increase the partial GC intensity using the low spare block condition adjustment factor under such considerations.

FIG. 5 illustrates a table regarding a range of amplification factors and how to determine a partial GC operation time period (ptGcT') for GC operations of different types according to one embodiment of the present invention. If the GC operation is the S2T type (where source blocks are SLC blocks and destination block is a TLC block), the amplification factor Amp is typically 1 under normal circumstances, but can be increased to 4 in case of the wear-leveling (WL) or the read-disturbance (RD) situation. Moreover, the partial GC operation time period $ptGCT_{S2T}$ can be determined as: $ptGcT_{S2T}=ptGcT*(Amp/2)*(1+(LOS/2))$, where the term (1+(LOS/2)) is only taken into consideration in the low spare block condition. If the GC operation is the T2T type (where source blocks are TLC blocks and destination block is a TLC block), the amplification factor Amp is typically greater than or equal to 1 and less than or equal to 32 under normal circumstances. In case of the wear-leveling or the read-disturbance situation, the amplification factor Amp can be increased to greater than or equal to 4 and less than or equal to 32. Moreover, the partial GC operation time period $ptGCT_{T2T}$ Can be determined as: $ptGcT_{T2T}=ptGcT*(Amp)*(1+(LOS/2))$, where the term (1+(LOS/2)) is only taken into consideration in the low spare block condition.

In the mixed-mode, the memory controller 110 will perform T2T GC operation N times and S2T GC operation once. Thus, the amplification factor Amp is greater than or equal to 2 and less than or equal to 32 in normal case. In case of the wear-leveling or the read-disturbance situation, the amplification factor is increased to be greater than or equal to 11 and less than or equal to 32. Moreover, the partial GC operation time period $ptGCT_{MIX\_S2T}$ (the S2T partial GC operation) in the mixed-mode can be determined as: $ptGCT_{MIX\_S2T}=ptGcT*((Amp+1)/3)*(1+(LOS/2))$, where the term "(1+(LOS/2))" is only taken into consideration in the low spare block condition. Moreover, the partial GC operation time period $ptGCT_{MIX\_T2T}$ (the T2T partial GC operation) in the mixed-mode can be determined as: $ptGCT_{MIX\_T2T}=ptGcT*((Amp+1)/3)*(1+(LOS/2))$, where the term "(1+(LOS/2))" is only taken into consideration in the low spare block condition.

FIG. 6 illustrates a table regarding a range of amplification factors and how to determine a partial GC operation time period (ptGcT') for GC operations of different types according to one embodiment of the present invention. If the GC operation is the S2X type (where source blocks are SLC blocks and destination block is an SLC block, a MLC block, a TLC block or a QLC block), the amplification factor Amp is typically 1 under normal circumstances, but can be increased to $A_{high}$ in case of the wear-leveling or the read-disturbance situation. Moreover, the partial GC operation time period $ptGCT_{S2X}$ can be determined as: $ptGcT_{S2X}=ptGcT*(Amp/EGBC_{S2X})*(1+k*LOS)$, where k is greater than 0 and the term "(1+k*LOS)" is only taken into consideration in the low spare block condition. The value "$EGBC_{S2X}$" corresponds to an expected number of spare blocks that will be gained after an S2X GC operation is completed. For example, the $EGBC_{S2S}$ is 1 (i.e., the minimal value), as an S2S GC operation may release one SLC block and consume one spare SLC block. $EGBC_{S2M}$ is 1, as an S2M GC operation may release two SLC blocks and consume one spare MLC block. $EGBC_{S2T}$ is 2, as an S2T GC operation may release three SLC blocks and consume one spare TLC block. $EGBC_{S2Q}$ is 3, as an S2O GC operation may release four SLC blocks and consume one spare QLC block.

If the GC operation is the X2X type (where source blocks and destination block are of the same type), the amplification factor Amp is greater than or equal to 1 and less than or equal to $A_{MAX}$ in normal case, but the amplification factor can be increased to be greater than or equal to $A_{high}$ and less than or equal to $A_{MAX}$ in case of the wear-leveling or the read-disturbance situation. Moreover, the partial GC operation time period $ptGCT_{X2X}$ can be determined as: $ptGcT_{X2X}=ptGcT*(Amp/EGBC_{X2X})*(1+k*LOS)$, where k is greater than 0 and the term "(1+k*LOS)" is only taken into consideration in the low spare block condition. The value "$EGBC_{X2X}$" corresponds to an expected number of spare blocks that will be gained after X2X GC operations are completed. Typically, several X2X GC operations may be necessary to gain a spare block. For example, as explained in FIG. 3, 4 or 5 T2T GC operations are necessary to gain a spare TLC block. In view of this, $EGBC_{X2X}$ will be set as 1, which is the minimal value.

In the mixed-mode, the memory controller 110 will perform X2X GC operation N times and S2X GC operation once. Thus, the amplification factor Amp is greater than or equal to ($EGBC_{mix}$-1) and less than or equal to $A_{MAX}$ in normal case. In case of the wear-leveling or the read-disturbance situation, the amplification factor is increased to be greater than or equal to ($EGBC_{mix}*A_{high}$-1) and less than or equal to $A_{MAX}$. Moreover, the partial GC operation time period $ptGCT_{mix}$ can be determined as:

$ptGcT_{mix} = ptGcT*((Amp+1)/(EGBC_{mix}))*(1+k*LOS)$, where k is greater than 0 and the term "(1+k*LOS)" is only taken into consideration in the low spare block condition. The value "$EGBC_{mix}$" corresponds to an expected number of spare blocks that will be gained after completing X2X GC operations N times and S2X GC operation once, which can be determined by: $EGBC_{mix} = EGBC_{X2X} + EGBC_{S2X}$.

Figure 7:
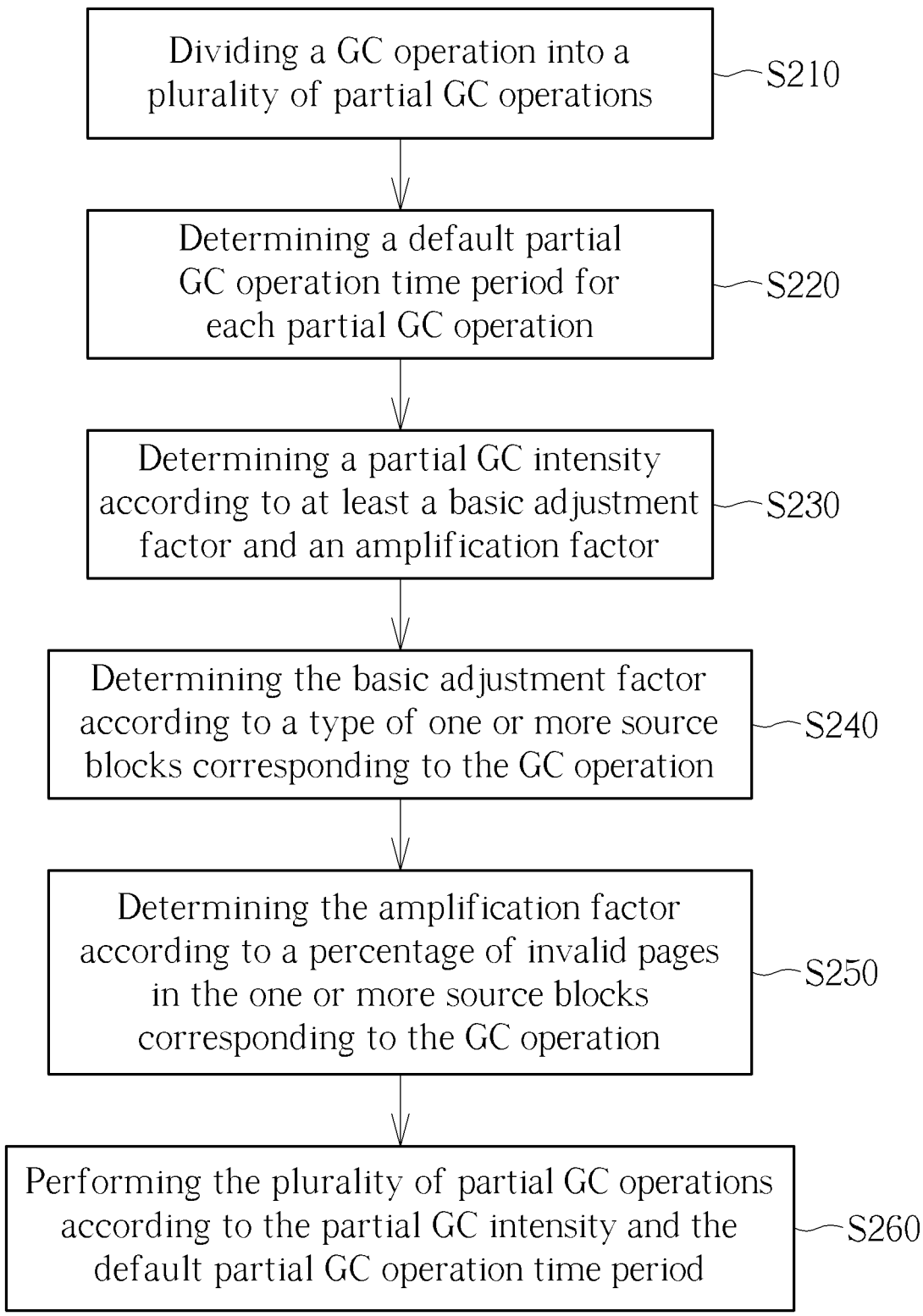
FIG. 7 is a diagram illustrating a flow of a method for managing GC operations according to an embodiment of the present invention.

FIG. 7 illustrates a method of managing GC operation for a flash memory. As shown in the figure, the method of the present invention includes the following simplified flow:

Step S210: dividing a GC operation into a plurality of partial GC operation;

Step S220: determining a default partial GC operation time period for each partial GC operation;

Step S230: determining a partial GC intensity according to at least a basic adjustment factor and an amplification factor;

Step S240: determining the basic adjustment factor according to a type of one or more source blocks corresponding to the GC operation;

Step S250: determining the amplification factor according to a percentage of invalid pages in the one or more source blocks corresponding to the GC operation; and Step S260: performing the plurality of partial GC operations according to the partial GC intensity and the default partial GC operation time period.

Since the principles and specific details of the foregoing steps have been explained in detail through the above embodiments, further descriptions will not be repeated here. It should be noted that the above flow can be enhanced by adding other extra steps or making appropriate modifications and adjustments, to improve flexibility and further enhance the efficiency of the GC operation. Furthermore, all the operations set forth in the above embodiments can be implemented by the memory controller 110 shown in FIG. 1.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function (s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing a garbage collection (GC) operation on a flash memory, comprising:

dividing a GC operation into a plurality of partial GC operations;

determining a default partial GC operation time period for each partial GC operation;

determining a partial GC intensity according to at least a basic adjustment factor and an amplification factor;

determining the basic adjustment factor according to a type of one or more source blocks corresponding to the GC operation;

determining the amplification factor according to a percentage of invalid pages in the one or more source blocks corresponding to the GC operation; and performing the plurality of partial GC operations according to the partial GC intensity and the default partial GC operation time period.

2. The method of claim 1, wherein the step of determining the amplification factor comprises:

when determining the amplification factor, excluding a source block whose valid pages have been partially moved to a destination block during a previous GC operation; and calculating an average of percentages of invalid pages in one or more source blocks whose valid pages have not been partially moved to the destination block during the previous GC operation; and determining the amplification factor according to a reciprocal of the average of percentages of invalid pages in the one or more source blocks whose valid pages have not been partially moved to the destination block during the previous GC operation.

3. The method of claim 2, wherein the step of determining the amplification factor comprises:

increasing a lower bound that is set for the amplification factor when determining the amplification factor in response to performing a wear-leveling operation or handling a read-disturbance situation.

4. The method of claim 1, wherein the step of determining the basic adjustment factor comprises:
determining the basic adjustment factor according to an expected number of spare blocks that will be gained after the GC operation is completed.

5. The method of claim 1, wherein the step of determining the basic adjustment factor comprises:
if the one or more source blocks corresponding to the GC operation and one or more destination blocks corresponding to the GC operation are of the same type, setting the basic adjustment factor as 1; and
if the one or more source blocks corresponding to the GC operation and one or more destination blocks corresponding to the GC operation are not of the same type, setting the basic adjustment factor as a reciprocal of the expected number of spare blocks that will be gained after the GC operation is completed.

6. The method of claim 1, further comprising:
if a number of spare blocks in the flash memory is lower than a low spare block threshold, determining a low spare block condition factor as (1+k*LOS), where k is greater than zero and LOS is an absolute value of a difference between the number of spare blocks in the flash memory and the low spare block threshold; and
determining the partial GC intensity according to the basic adjustment factor, the amplification factor and the low spare block condition factor.

7. The method of claim 1, further comprising:
dividing a first GC operation into a plurality of first partial GC operations and dividing a second GC operation into a plurality of second partial GC operations, wherein the first GC operation and the second GC operation are not of the same type;
determining a first partial GC intensity and a second partial GC intensity according to at least a mixed-mode basic adjustment factor and a mixed amplification factor;
performing the plurality of first partial GC operations according to the first partial GC intensity and the default partial GC operation time period, as well as performing the plurality of second partial GC operations according to the second partial GC intensity and the default partial GC operation time period.

8. The method of claim 7, further comprising:
determining the mixed-mode basic adjustment factor according to a summation of an expected number of spare blocks that will be gained after completing the first GC operation a predetermined number of times, and an expected number of spare blocks that will be gained after completing the second GC operation once.

9. The method of claim 7, further comprising:
setting a lower bound for the mixed-mode amplification factor according to a summation of an expected number of spare blocks that will be gained after completing the first GC operation a predetermined number of times, and an expected number of spare blocks that will be gained after completing the second GC operation once.

10. A memory controller for use in a flash memory to control the flash memory and manage a garbage collection (GC) operation on the flash memory, comprising:
a storage unit, configured to store information and program codes;
a processing unit, operable to execute the program codes to be configured to:
divide a GC operation into a plurality of partial GC operations;
determine a default partial GC operation time period for each partial GC operation;
determine a partial GC intensity according to at least a basic adjustment factor and an amplification factor;
determine the basic adjustment factor according to a type of one or more source blocks corresponding to the GC operation;
determine the amplification factor according to a percentage of invalid pages in the one or more source blocks corresponding to the GC operation; and
perform the plurality of partial GC operations according to the partial GC intensity and the default partial GC operation time period.

11. The memory controller of claim 10, wherein the processing unit is configured to:
when determining the amplification factor, exclude a source block whose valid pages have been partially moved to a destination block during a previous GC operation; and
calculate an average of percentages of invalid pages in one or more source blocks whose valid pages have not been partially moved to the destination block during the previous GC operation; and
determine the amplification factor according to a reciprocal of the average of percentages of invalid pages in the one or more source blocks whose valid pages have not been partially moved to the destination block during the previous GC operation.

12. The memory controller of claim 10, wherein the processing unit is configured to:
increase a lower bound that is set for the amplification factor when determining the amplification factor in response to performing a wear-leveling operation or handling a read-disturbance situation.

13. The memory controller of claim 10, wherein the processing unit is configured to:
determine the basic adjustment factor according to an expected number of spare blocks that will be gained after the GC operation is completed.

14. The memory controller of claim 10, wherein the processing unit is configured to:
if the one or more source blocks corresponding to the GC operation and one or more destination blocks corresponding to the GC operation are of the same type, set the basic adjustment factor as 1; and
if the one or more source blocks corresponding to the GC operation and one or more destination blocks corresponding to the GC operation are not of the same type, set the basic adjustment factor as a reciprocal of the expected number of spare blocks that will be gained after the GC operation is completed.

15. The memory controller of claim 10, wherein the processing unit is configured to:
if a number of spare blocks in the flash memory is lower than a low spare block threshold, determine a low spare block condition factor as (1+k*LOS), where k is greater than zero and LOS is an absolute value of a difference between the number of spare blocks in the flash memory and the low spare block threshold; and
determine the partial GC intensity according to the basic adjustment factor, the amplification factor and the low spare block condition factor.

16. The memory controller of claim 10, wherein the processing unit is configured to:

divide a first GC operation into a plurality of first partial GC operations and divide a second GC operation into a plurality of second partial GC operations, wherein the first GC operation and the second GC operation are not of the same type;

determine a first partial GC intensity and a second partial GC intensity according to at least a mixed-mode basic adjustment factor and a mixed amplification factor; and perform the plurality of first partial GC operations according to the first partial GC intensity and the default partial GC operation time period, as well as perform the plurality of second partial GC operations according to the second partial GC intensity and the default partial GC operation time period.

17. The memory controller of claim 16, wherein the processing unit is configured to:

determine the mixed-mode basic adjustment factor according to a summation of an expected number of spare blocks that will be gained after completing the first GC operation a predetermined number of times, and an expected number of spare blocks that will be gained after completing the second GC operation once.

18. The memory controller of claim 16, wherein the processing unit is configured to:

setting a lower bound for the mixed-mode amplification factor according to a summation of an expected number of spare blocks that will be gained after completing the first GC operation a predetermined number of times, and an expected number of spare blocks that will be gained after completing the second GC operation once.

19. A storage system, comprising:

a flash memory; and a memory controller for controlling the flash memory and managing a garbage collection (GC) operation on the flash memory, wherein the memory controller is configured to:

dividing a GC operation into a plurality of partial GC operations;

determining a default partial GC operation time period for each partial GC operation;

determining a partial GC intensity according to at least a basic adjustment factor and an amplification factor;

determining the basic adjustment factor according to a type of one or more source blocks corresponding to the GC operation;

determining the amplification factor according to a percentage of invalid pages in the one or more source blocks corresponding to the GC operation; and performing the plurality of partial GC operations according to the partial GC intensity and the default partial GC operation time period.

* * * * *